(12) United States Patent
Shepherd

(10) Patent No.: US 8,346,903 B2
(45) Date of Patent: Jan. 1, 2013

(54) PRINT SERVER, MOBILE COMPUTING DEVICE, SYSTEM AND METHOD FOR PRINTING USING A MOBILE COMPUTING DEVICE

(75) Inventor: Michael D. Shepherd, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 732 days.

(21) Appl. No.: 11/289,211

(22) Filed: Nov. 29, 2005

(65) Prior Publication Data

US 2007/0124436 A1 May 31, 2007

(51) Int. Cl.
| | |
|---|---|
| G06F 15/173 | (2006.01) |
| G06F 15/16 | (2006.01) |
| H04W 24/00 | (2009.01) |

(52) U.S. Cl. ........ 709/223; 709/201; 709/202; 709/203; 709/217; 709/218; 709/219; 709/224; 455/456.6

(58) Field of Classification Search .......... 709/223–225, 709/201–203, 217–219; 705/10, 7.11–7.16, 705/7.22; 455/456.6
See application file for complete search history.

(56) References Cited

U.S. PATENT DOCUMENTS

| | | | | |
|---|---|---|---|---|
| 5,555,376 | A | | 9/1996 | Theimer et al. .......... 395/200.09 |
| 5,611,050 | A | | 3/1997 | Theimer et al. .......... 395/200.09 |
| 5,978,837 | A | | 11/1999 | Foladare et al. ............... 709/207 |
| 6,026,375 | A | * | 2/2000 | Hall et al. ....................... 705/26 |
| 6,144,917 | A | * | 11/2000 | Walters et al. ................. 701/204 |
| 6,487,189 | B1 | | 11/2002 | Eldridge et al. ............... 370/338 |
| 6,493,760 | B1 | | 12/2002 | Pendlebury et al. .......... 709/229 |
| 6,659,662 | B2 | * | 12/2003 | Grohs ............................ 400/76 |
| 6,665,712 | B2 | | 12/2003 | Pickup .......................... 709/219 |
| 6,748,306 | B2 | | 6/2004 | Lipowicz ........................ 701/36 |
| 6,823,188 | B1 | | 11/2004 | Stern .......................... 455/456.1 |
| 6,850,901 | B1 | * | 2/2005 | Hunter et al. ............... 705/26.35 |
| 6,879,836 | B2 | * | 4/2005 | Nakamoto et al. .......... 455/456.2 |
| 6,922,725 | B2 | | 7/2005 | Lamming et al. ............. 709/227 |
| 6,937,354 | B2 | | 8/2005 | Kobayashi et al. .......... 358/1.13 |
| 6,980,319 | B2 | * | 12/2005 | Ohta ............................ 358/1.18 |
| 6,993,490 | B2 | * | 1/2006 | Chen et al. ........................ 705/1 |

(Continued)

FOREIGN PATENT DOCUMENTS

WO WO 2005027004 * 3/2005

OTHER PUBLICATIONS

Hassan A. Karimi and Xiong Liu: 'A predictive location model for location-based services'—GIS Proceedings of the 11th ACM international symposium on Advances in geographic information systems, Nov. 7-8, 2003, New orleans, Louisianna, USA.*

(Continued)

Primary Examiner — Catherine Thiaw
(74) Attorney, Agent, or Firm — Alix, Yale & Ristas, LLP

(57) ABSTRACT

A print server, a mobile computing device, a method of printing, and a system for printing using a mobile computing device. The print server includes a submission processor, an orchestration processor, and a positioning processor. The print server is configured to track the global position of a mobile computing device and determine a print location and/or print time based upon the global position of the mobile computing device. The method involves tracking the global position of the mobile computing device and determining the print location and/or print time based upon the global position of the mobile computing device.

17 Claims, 4 Drawing Sheets

U.S. PATENT DOCUMENTS

| | | | |
|---|---|---|---|
| 7,103,368 B2 * | 9/2006 | Teshima | 455/456.3 |
| 7,213,048 B1 * | 5/2007 | Parupudi et al. | 709/203 |
| 7,280,978 B1 * | 10/2007 | Joao | 705/16 |
| 7,624,024 B2 * | 11/2009 | Levis et al. | 705/1.1 |
| 7,626,717 B2 * | 12/2009 | Rai et al. | 358/1.15 |
| 7,693,735 B2 * | 4/2010 | Carmi et al. | 705/7.16 |
| 2001/0014911 A1 * | 8/2001 | Doi et al. | 709/221 |
| 2001/0029531 A1 * | 10/2001 | Ohta | 709/223 |
| 2001/0049643 A1 * | 12/2001 | Davis | 705/27 |
| 2002/0051178 A1 * | 5/2002 | Nakayasu et al. | 358/1.15 |
| 2002/0059111 A1 * | 5/2002 | Ding et al. | 705/26 |
| 2002/0067308 A1 | 6/2002 | Robertson | 342/357.17 |
| 2002/0099593 A1 * | 7/2002 | Kraft et al. | 705/10 |
| 2002/0135516 A1 * | 9/2002 | Sollenberger et al. | 342/387 |
| 2003/0050963 A1 | 3/2003 | Lamming et al. | 709/203 |
| 2003/0081249 A1 * | 5/2003 | Ahmad et al. | 358/1.15 |
| 2003/0134648 A1 * | 7/2003 | Reed et al. | 455/456 |
| 2003/0220982 A1 * | 11/2003 | Tran et al. | 709/218 |
| 2004/0027607 A1 | 2/2004 | Nishigai | 358/1.15 |
| 2004/0199631 A1 * | 10/2004 | Natsume et al. | 709/225 |
| 2005/0114015 A1 * | 5/2005 | Motoyama et al. | 701/207 |
| 2005/0174609 A1 * | 8/2005 | Thurlow | 358/425 |
| 2005/0206534 A1 * | 9/2005 | Yamane et al. | 340/994 |
| 2005/0233774 A1 | 10/2005 | Ladouceur et al. | 455/567 |
| 2006/0270421 A1 * | 11/2006 | Phillips et al. | 455/457 |
| 2006/0277078 A1 * | 12/2006 | Ohmori et al. | 705/5 |
| 2007/0018811 A1 * | 1/2007 | Gollu | 340/539.13 |
| 2007/0038506 A1 * | 2/2007 | Noble et al. | 705/13 |
| 2009/0310030 A1 * | 12/2009 | Litwin et al. | 348/731 |
| 2011/0015953 A1 * | 1/2011 | Maunus | 705/5 |

OTHER PUBLICATIONS

Gokhan Yavas et al, "A data mining approach for location prediction in mobile environments", Data & Knowledge Engineering, 54 (2005), pp. 121-146.

* cited by examiner

PRINT SERVER, MOBILE COMPUTING DEVICE, SYSTEM AND METHOD FOR PRINTING USING A MOBILE COMPUTING DEVICE

BACKGROUND

The embodiments disclosed herein relate to the printing of files using a mobile computing device.

A user of a mobile computing device who wants to print documents typically has a pre-configured set of printers listed in the graphical user interface of their mobile device. The user can select a printer based upon its print-job capabilities. If the mobile user is traveling to a destination where they are unfamiliar with the printer options, they may not have knowledge as to which printer will meet their needs. Furthermore, the destination and/or expected arrival time of the user may change after a print command has been sent. It would be useful to develop a method and system for printing files using a mobile computing device that takes into account changes in the user's itinerary and assists the user when printing to unfamiliar locations.

SUMMARY

One embodiment is a print server comprising a submission processor configured to receive a print request, a positioning processor configured to track a global position of a mobile computing device, and an orchestration processor configured to determine at least one of a print location and a print time based upon at least one global position of the mobile computing device. In many cases, the orchestration processor determines the print time based upon periodic global position information for the mobile computing device. The orchestration processor frequently selects a printer based upon a first set of global position information for the mobile computing device. Usually, the orchestration processor determines both the print location and the print time.

In some cases, the orchestration processor changes the print location and/or print time in response to tracked changes in the global position of the mobile computing device. The print server often is configured to change at least one of the print location and print time based upon a request received from the mobile computing device.

The print server typically transmits at least one of a proposed print location and a proposed print time to the mobile computing device. The submission processor receives the file to be printed from the mobile computing device or from a file server. The print server typically is configured to receive a print job status report from the printer and transmit the print job status report to the mobile computing device. In some embodiments, the orchestration processor uses data mining to determine at least one of the print time and the print location. The print server frequently is part of a network including multiple print servers and the network includes networking protocols for communication between various print servers.

Another embodiment is a method of printing using a mobile computing device comprising selecting a file to be printed, selecting print parameters, transmitting data indicative of the selected file and the print parameters, tracking the global position of the mobile computing device, determining at least one of a print location and a print time based upon at least one global position of the mobile computing device, and printing the file. In many cases, both the print location and the print time are determined based upon at least one global position of the mobile computing device. Sometimes, the method further comprises changing at least one of the print location and the print time in response to tracked changes in the global position of the mobile computing device.

The data indicative of at least one of the proposed print location and print time can be generated using data mining. Frequently, the proposed print time is proximate the expected pick up time of the printed file. In some embodiments, the method further comprises rejecting at least one of the proposed print location and print time using the mobile computing device and generating data indicative of an alternative print location and/or print time. The file to be printed usually is located on the mobile computing device or on a file server connected to the print server. In certain cases, both the print location and the print time are determined by the print server. Sometimes, the print location is determined by the print server and a proposed arrival time is transmitted by the mobile device to the print server.

A further embodiment is a printing system comprising a mobile computing device, a print server, and a printer. The print server includes a submission processor configured to receive a print request, a positioning processor configured to track the global position of the mobile computing device, and an orchestration processor configured to determine at least one of a print location and a print time based upon at least one global position of the mobile computing device. The printer is configured to receive printing instructions from the print server. The orchestration processor frequently determines both the print location and the print time. Sometimes, the orchestration processor determines the print location and the mobile device transmits to the print server an arrival time.

Yet another embodiment is a mobile computing device comprising a communication system, a display, and a memory having an operating system stored therein. The operating system is configured to initiate a query through the communication system to a print server to select printing information including at least one of a print location and a print time based upon the global position of the mobile computing device, receive a response from the print server through the communication system, and display at least one of the print location and the print time on the display. Often, the printing information includes both a print location and a print time. In certain cases, the operating system is configured to receive a subsequent response from the print server that includes a change in at least one of the print location and print time, and display the change in at least one of the print location and print time on the display.

The operating system of the mobile computing device can include a processor for estimating an arrival time to a print location. Sometimes, the memory contains printer locations for preconfigured printers and the operating system is configured to calculate and display a distance from the mobile device to a preconfigured printer.

DETAILED DESCRIPTION

Figure 1:
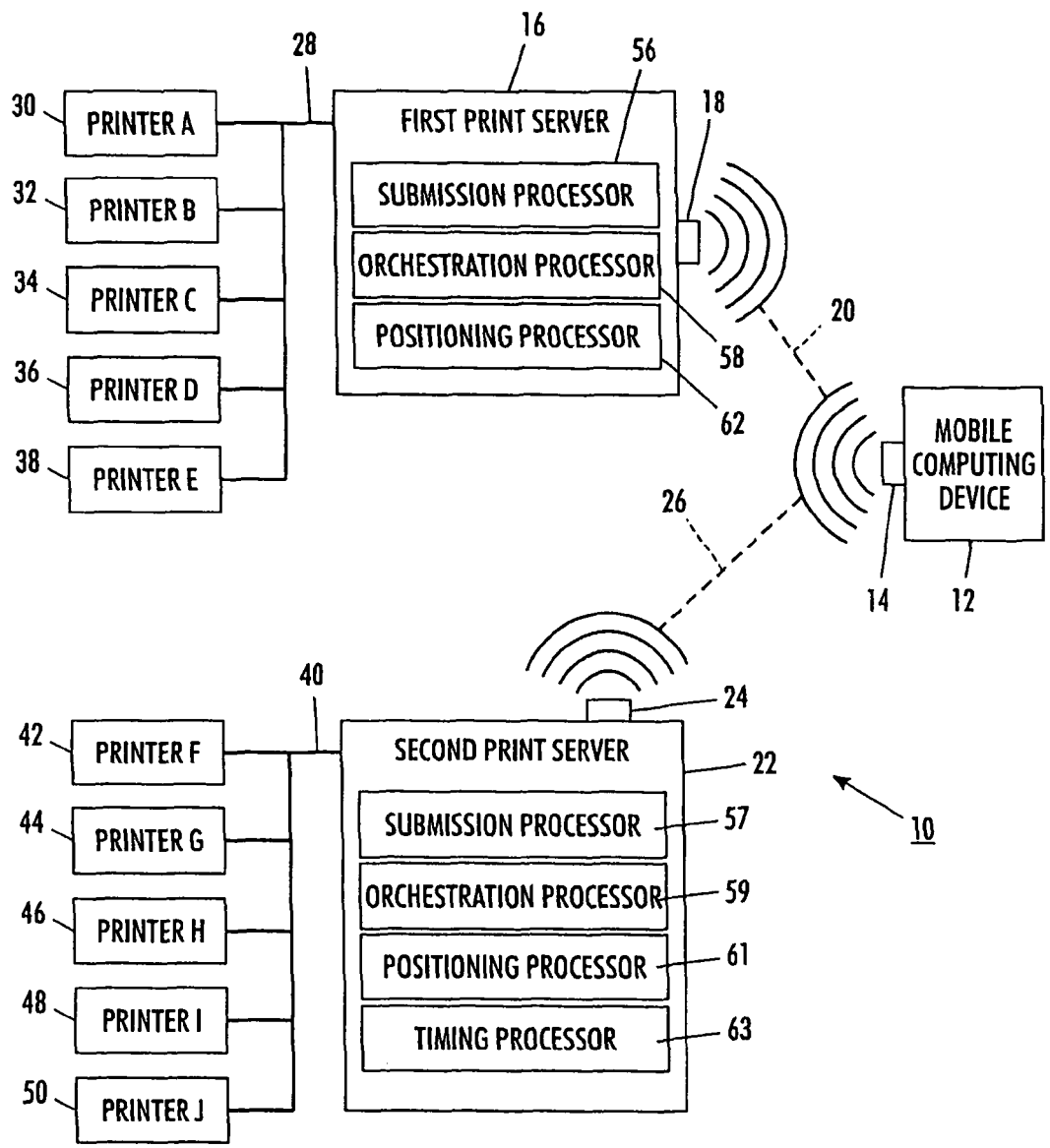
FIG. 1 is a schematic drawing of a system of one embodiment in which a mobile computing device is used to request printing.

The print server, method of printing, and printing system disclosed herein assist the mobile user by selecting a convenient printer for a user who may be unfamiliar with the printers located at their print destination. In one embodiment, the print server, method and printing system promote confidentiality in the printing of documents to a remote location by carefully timing the printing process so that the document is printed shortly before it is picked up by the mobile user. This "just-in-time" printing method also reduces waste that otherwise may occur if the user's destination changes or if the document is mixed with a stack of other documents.

As used herein, the term "printer" encompasses any apparatus, such as a digital copier, bookmaking machine, facsimile machine, multi-function machine, etc. that performs a print outputting function for any purpose. A "print server" is a computer that manages one or more printers, and a "file server" is a computer and storage device that stores files. As used herein, a "mobile computing device" shall be construed broadly, to encompass any portable device that can act as a source of image data in any format, such as a portable PC, PDA, digital camera, wireless phone, Blackberry, and any other RF or IR enabled digital devices, including but not limited to cellular, Bluetooth and WiFi enabled devices.

The term "submission processor" as used herein refers to a processor in a print server that receives a request for printing a file. The submission processor also usually receives a file to be printed from the mobile computing device or a file server. As used herein, the term "orchestration processor" refers to a processor which ensures that the necessary print requirements are met and schedules the print job. For example, if a print job requires imposition, printing and stapling, the orchestration processor manages the execution of the requirements through different available services, determines which printers are capable of performing a particular print job and schedules an appropriate device to do the work. Sometimes, the orchestration processor also has the processing capability to transfer the print request to another print server if it determines that there is no connected printer meeting all of the print requirements. The "timing processor" arranges for appropriate timing of a print job and can be a component of the orchestration processor. In certain cases, the operating system of the mobile computing device determines an arrival time that is used by the print server to schedule printing. Furthermore, the operating system of the mobile computing device can be configured to calculate and display a distance from the mobile computing device to the print location.

As used herein, a "positioning processor" tracks the position of the mobile computing device and sends periodic global position updates to the orchestration processor. If the expected destination or arrival time of the mobile user changes, the orchestration processor may revise the print time and/or print location. "Tracking" refers to the collection of global position information for the mobile computing device. Usually, the global position information is collected on a periodic basis. A "location aware device" is a device that can electronically determine its global position.

FIG. 1 illustrates the system of the invention, generally designated as 10, in which a mobile computing device 12 is equipped with a global positioning component 14. The global positioning component 14 typically comprises a Global Positioning System (GPS) receiver which receives position signals sent from global positioning satellites, but also can be another type of location aware device. When a user of the mobile computing device 12 requests customized printing of a selected file, as will be described in detail below, the component 14 receives global positioning data for the mobile computing device 12. This global position usually is also the global position of the user. If the user is near the desired print destination, they can transmit this global position data to a preferred print server configured on the mobile device or use a directory-based lookup service to choose a suitable print server. If the user wishes to have the document or other file printed in a region remote from their current location, they can enter a general location where they want to pick up the printed file, and a suitable print server will be automatically located using a suitable technology. Non-limiting examples of technologies include those described in commonly assigned U.S. Pat. No. 6,922,725, the contents of which are incorporated herein by reference in their entirety.

In a first embodiment, all of the printers that are wired to a particular print server are located geographically near that server. In this case, a first print server 16 has a wireless device 18 that receives data indicative of the mobile device's global position and printing requirements. A suitable printer connected to the first print server 16 by a connection system 28 is then selected based upon the printing requirements for the file in the manner described below in further detail. In FIG. 1, printer A, designated as 30, is a top quality monochrome black printing device while printer B, designated as 32, is set up for printing labels and envelopes. Printer C, designated as 34, is a fax machine, and printer D, designated as 36, is a bookmaking copier. Printer E, designated as 38, is a photocopier/printer. If more than one printer is suitable, the printer that is most convenient to the building entrance can be selected.

If there is no suitable printer connected to the first print server 16, the user can be given the options of changing the print requirements and subsequently receiving an assignment to one of printers A-E, or searching for a print server at a different location. If the first option is chosen, the user either revises the print requirements, or deletes the print request and enters a new print request with different print requirements. The user is then provided with a new proposed printer. This new printer can be accepted or rejected. If the second option is chosen (searching for a print server at a different location), a wireless device 24 on a second print server 22 in the area communicates via a directory-based lookup service with the mobile computing device 12. The second print server 22 selects a suitable printer and transmits information about the selected printer to the mobile computing device 12. In FIG. 1, printer F, designated as 42, is a top quality color printer, while printer G, designated as 44, is for printing color drafts. Printer H, designated as 46, is a fax machine and printers I and J, designated as 48 and 50, respectively, are photocopier/printers. The printers are connected to the second print server 22 by a connection system 40.

In another embodiment, in which the printers connected to the second print server 22 are not all located near the server, each printer has its own GPS component and the second print server 22 searches for the most convenient printer with the capabilities required for a particular print job. This can be achieved, for example, using an output management service (OMS) or management information system (MIS) that manages a fleet of printers. The OMS/MIS can appropriately choose printers that fulfill the print job requirements.

In order to process and execute a print request, the first print server 16 includes a submission processor 56 that receives a request from the mobile computing device 12 to print a particular file. An orchestration processor 58 determines which printers connected to the first print server 16 are suitable for printing the file. Some of the printing requirements may be stored within the file and others may be entered by the user through use of the mobile computing device 12. After the first print server 16 selects an appropriate printer, a message is transmitted to the mobile computing device 12 asking for confirmation of the selected printer. Once confirmation is received, the orchestration processor 58 arranges for execution of the print job. Typically, the job is timed to take place only a brief time before arrival of the mobile user in order to take into account last minute changes in a mobile user's destination and/or so that a document does not remain in a printer tray for an extended period of time. The orchestration processor 58 communicates with a positioning processor 62 that tracks the position of the mobile computing device 12 and sends revised instructions to the orchestration processor 58 if the mobile user's global position changes from the expected course. In some cases, the mobile computing device 12 tracks its position relative to the print location and sends print time information, or revised print time information, to the orchestration processor 58 in order to avoid early printing.

If the mobile user is or becomes closer to a second print server 22 than to the first print server 16 (or if the mobile user is connected to the second print server 22 as a result of entering a proposed print destination), a submission processor 57 in the second print server 22 receives a print request from the mobile computing device 12. An orchestration processor 59 determines which printers connected to the second print server 22 are suitable for printing the file, and selects a suitable printer. The two print servers 16 and 22 can work in a peer-to-peer fashion, if necessary, to choose a destination printer of the other print server. Alternatively, a type of OMS/MIS that manages a fleet of print servers can be used to redirect a print request.

After the orchestration processor 59 selects an appropriate printer, a message is transmitted to the mobile computing device 12 asking for confirmation of the selected printer. Once confirmation is received, the orchestration processor 59 arranges for execution of the print job. The global position of the mobile computing device 12 is tracked using a positioning processor 61. The second print server 22 can include a timing processor 63, which may be part of, or separate from, the orchestration processor 59. The timing processor 63 can arrange for "just-in-time" printing. This timing minimizes the period that the printed document sits in the printer tray before the mobile user picks it up and is therefore particularly useful for confidential documents. The timing processor 63 typically allows for late last-minute changes in the print location based upon last-minute changes in the user's destination and/or arrival time. The timing processor 63 communicates with the positioning processor 61, which tracks the position of the mobile user. The timing processor sends updated instructions to the orchestration processor 59 if the global position of the mobile computing device 12 changes from its expected geographic course, or if the expected arrival time of the mobile user changes. While the timing processor frequently is located on the second print server 22, the memory of the mobile computing device 12 also can have a timing processor as part of its operating system that determines an arrival time of the user and transmits data to the print server indicating the time at which the print job should be complete. The mobile computing device 12 thus can be used to enable "just-in-time" printing in order that the print job does not sit in the printer tray for an extended period before the arrival of the mobile user.

Various wireless technologies can be used to provide communication between the mobile computing device 12 and a remote printer server, and between a print server and remote file server which contains a file to be printed. Non-limiting examples of suitable technologies are disclosed in commonly assigned U.S. Pat. No. 6,922,725, the disclosure of which is incorporated herein by reference in its entirety.

Figure 2:
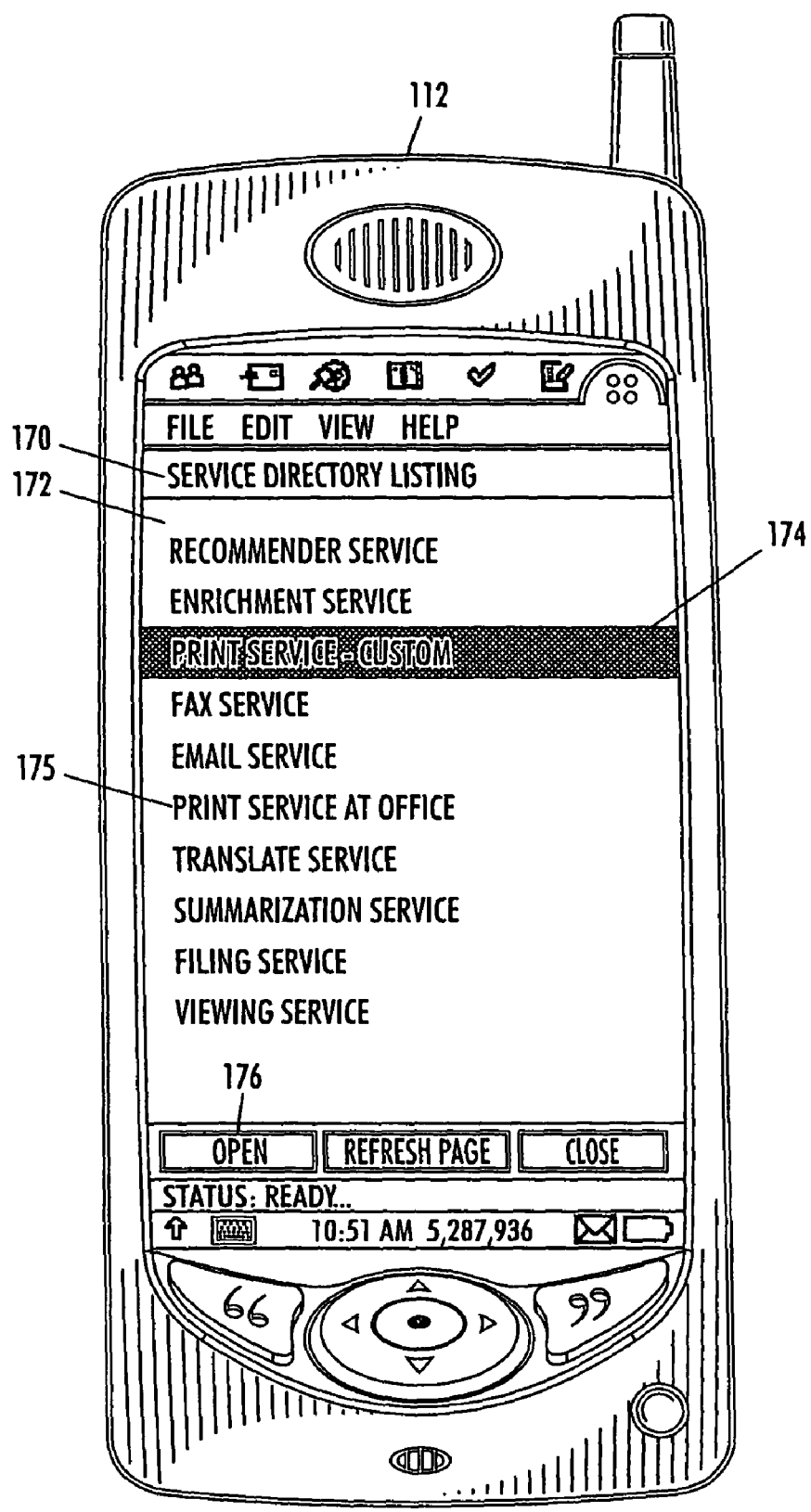
FIG. 2 illustrates an example display on a mobile computing device after a user has requested a directory listing.

FIG. 2 shows an example display on a mobile computing device 112 after a user has requested a service directory listing at 170. A list of available services is provided in a display 172. One of the options is "Print Service—Custom" designated as 174. Another option is "Print Service at Office" designated as 175. Selection of this service enables the user to choose from a list one or more printers that the user customarily uses at the office. In some embodiments, if a preconfigured printer is selected, the mobile computing device can calculate and display a distance to the preconfigured printer without requiring contact with a print server. For printing to printers that are not listed on the mobile computing device 112 and/or for automatic assignment of a printer, the mobile user highlights the display "Print Service—Custom" at 174 and presses the "Open" button at 176. This typically occurs after the user has selected the file to be printed.

Figure 3:
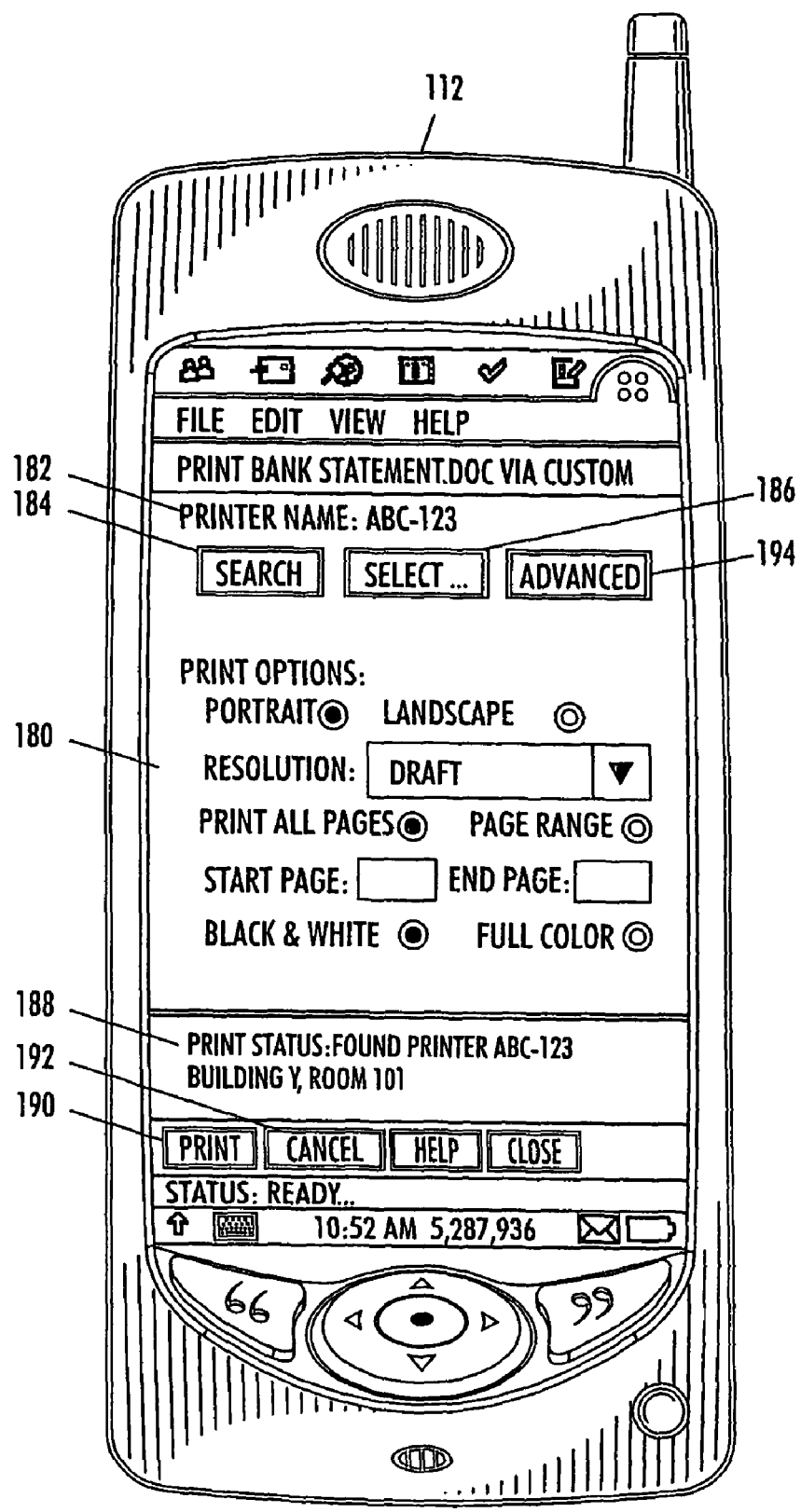
FIG. 3 illustrates an example display on a mobile computing device after a user has requested custom printing.

FIG. 3 illustrates an example display on a mobile computing device 112 after a user has opened "Print Service—Custom." Based upon the location of the user and the type of file to be printed, a set of print options is displayed at 180 and the name/location of an automatically selected printer is displayed at 182. The most convenient printer based upon the current position of the mobile user which has the capabilities necessary to complete the print job based upon the printer requirements embedded in the file is the printer that is automatically selected. If the user wishes to specify print conditions in addition to those displayed at 180 or modify the print conditions that are shown, the user can press "Advanced" at 194 and enter the desired print conditions. The "Select" button 186 can be used to select from a pre-configured set of print servers on the mobile computing device 112. After additional print conditions have been input, the name of the automatically selected printer at 182 may or may not change. Details of the printer's location and the print status are displayed at 188. If the user is not satisfied with the automatically selected printer, the user can press "Search" at 184. The user subsequently can enter a general destination in order to receive an assignment to a print server at a different location. For example, the user can enter a city name, or can select a print server from a directory such as Microsoft's ActiveDirectory$^R$, or another source available through their secure network or a public network. In some cases, the initially assigned print server can select a different print server at approximately the same location.

As indicated above, the job status display at 188 provides print job details such as what printer has been assigned and whether the print job has been executed. When the user is ready to request printing, the "Print" button at 190 is pressed. Printing will then occur at an appropriate time before the user arrives at the destination. If, before printing actually occurs, the mobile user wants to cancel a print job, the user can re-enter the print display shown in FIG. 3 and press the "Cancel" button 192. If, before printing actually occurs, the print location changes automatically as a result of the positioning processor tracking the global position of the mobile computing device, the new print location will be displayed at 188. In some cases, an audible signal will be transmitted over the mobile computing device 112 to inform the mobile user that the print destination has been automatically revised.

In certain cases, the projected print completion time is also displayed at 188 and this display is automatically revised and updated prior to printing if changes in the mobile user's global position, or the workload of the printer, justify revisions to the print time.

Figure 4:
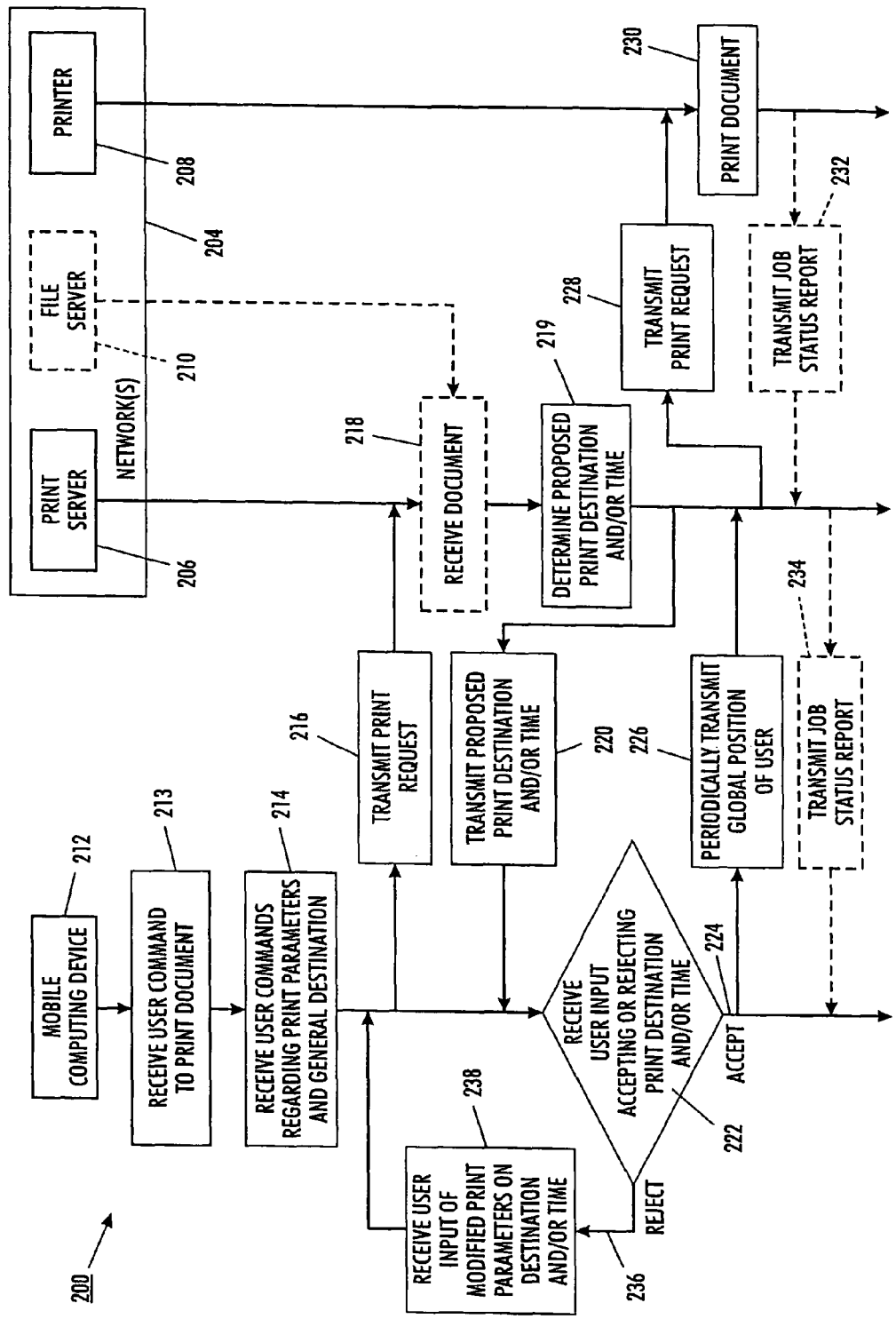
FIG. 4 shows actions performed by a mobile computing device, a print server, and a printer to print a file.

FIG. 4 shows the actions performed by a mobile computing device, a print server, and a printer in order to print a file, such as a document. The overall method is designated as 200. The system includes a mobile computing device 212, and one or more networks 204 that include a print server 206, a printer 208 connected to the print server 206, and often also a file server 210. Multiple print servers, printers and file servers typically are included but single elements are illustrated in FIG. 4 for purposes of clarity. A mobile computing device 212 receives a user command at 213 to print a document. The mobile computing device 212 receives user commands at 214 regarding print parameters and in some cases a general print destination. The mobile computing device 212 then transmits a print request at 216 to the print server 206. The print request may include the document to be printed, if it is on the mobile computing device 212, or the print server 206 can receive the document at 218 from the file server 210 based upon entry of a file name on the mobile computing device 212. The global position of the mobile computing device 212 often is transmitted as part of the print request. The print server 206 determines a proposed print destination and/or time at 219 and then transmits the proposed print destination and/or time to the mobile computing device at 220. Communication typically occurs between the printer 208 and the print server 206 to determine printer availability.

The user of the mobile computing device 212 then accepts or rejects the proposed print destination and/or time at 222. If the proposed print destination or time is rejected at 236, the mobile device receives user input of modified print parameters or a modified print destination or time at 238. This modification may be based upon general or specific input from the mobile user, as described above. Based upon these modified parameters, a new print request is transmitted at 216. After the proposed destination and/or time are accepted at 224, the global position of the user is periodically transmitted at 226. The mobile computing device 212 also can be configured to transmit an arrival time of the mobile user which can be used by the print server 206 to schedule the print time. A print request is transmitted by the print server 206 at 228 to the printer 208. The file, such as a document, is printed at 230. Usually, after printing, a job status report is transmitted at 232 from the printer 208 to the print server 206. This job status report typically is then transmitted at 234 from the print server 206 to the mobile computing device 212.

When the user is printing a file for which just-in-time printing is desired, transmission of the print request at 228 includes transmission of the proposed print time. This proposed print time can be updated in subsequent transmissions at 228 as a result of changes in the print time based upon updates in the periodic transmission of the global position of the user at 226.

In one embodiment, data mining and/or a knowledge-base is used to predict the path of the mobile user and select an appropriate printer based upon this prediction. Details regarding data mining are disclosed in Yavas, G. et al., "A data mining approach for location prediction in mobile environments," *Data Knowledge Engineering*, 54 (2005) 121-146, the contents of which are incorporated herein by reference in their entirety. A location-capable print server typically contains all the locations of the printers which it services. The print server logs or a populated knowledge-base would contain the historical usage of the printers for each user, job type, etc. Although some printers may be physically closer to the mobile user than others, the travel path must be considered in order to determine actual proximity. Data mining of the positions of past mobile users as they had traversed the location to the printers would provide a means for the print server to estimate travel paths of mobile users. The resulting path information could be displayed on the mobile device via a suitable method, including but not limited to the method described by U.S. Pat. No. 6,665,712 "System and Method for Locating an Output Device".

In another embodiment, the print request is transmitted from a device other than the mobile computing device, such as the mobile user's home computer. The mobile user's global position is then tracked using the mobile computing device. Any useful changes in print time and/or location can be transmitted automatically based upon changes in the mobile user's global position. Changes in the print destination and/or time can be sent to the mobile user via the mobile computing device. Furthermore, the mobile user can initiate changes using the mobile computing device.

It will be appreciated that various of the above-disclosed and other features and functions, or alternatives thereof, may be desirably combined into many other different systems or application. Various presently unforeseen or unanticipated alternatives, modifications, variations, or improvements therein may be subsequently made by those skilled in the art which are also intended to be encompassed by the following claims. The claims can encompass embodiments in hardware, software, or a combination thereof.

What is claimed is:

1. A print server comprising:
    a submission processor configured to receive a print request from a mobile computing device that contains a global positioning component,
    a positioning processor configured to track a global position of a mobile computing device, and
    an orchestration processor configured to determine a print location that is separate from the mobile computing device and a print time based upon an estimated arrival time of a user, as estimated using an operating system in the mobile computing device and transmitted by the mobile computing device to the print server, wherein the orchestration processor changes the print time and print location in response to tracked changes in the global position of the mobile computing device, and the submission processor receives a file to be printed from one of the mobile computing device and a file server.

2. The print server of claim 1, wherein the orchestration processor selects a printer based upon a first set of global position information for the mobile computing device.

3. The print server of claim 1, wherein the print server transmits the print time to the mobile computing device.

4. The print server of claim 1, wherein the print server is configured to receive a print job status report from a printer and transmit the print job status report to the mobile computing device.

5. The print server of claim 1, wherein the orchestration processor uses data mining to determine at least one of the print time and the print location.

6. The print server of claim 1, wherein the print server is part of a network including multiple print servers and the network includes networking protocols for communication among the multiple print servers.

7. A method of printing using a mobile computing device that contains a global positioning component, comprising:
    selecting a file to be printed,
    selecting print parameters,
    transmitting data indicative of the selected file and the print parameters from a mobile computing device to a print server,
    the print server tracking the global position of the mobile computing device,
    estimating an arrival time using an operating system in the mobile computing device,
    transmitting the estimated arrival time to the print server, the print server determining a print location that is separate from the mobile computing device and a print time based upon at least one global position of the mobile computing device, changing the print time and print location in response to tracked changes in the global position of the mobile computing device, and printing the file to a location that is separate from the mobile computing device, wherein the file to be printed is located on one of the mobile computing device and a file server connected to the print server.

8. The method of claim 7, wherein the print time is determined using data mining.

9. The method of claim 7, wherein the print time is proximate the expected pick-up time of the printed file.

10. The method of claim 7, further comprising rejecting at least one of the print location and print time using the mobile computing device and generating data indicative of at least one of an alternative print location and an alternative print time.

11. The method of claim 7, wherein the print location and the print time are determined by the print server.

12. A printing system, comprising:
a mobile computing device containing a global positioning component,
a print server including a submission processor configured to receive a print request from the mobile computing device, a positioning processor configured to track a global position of the mobile computing device, and an orchestration processor configured to determine a print location that is separate from the mobile computing device and a print time based upon an estimated arrival time of a user, as estimated using an operating system in the mobile computing device and transmitted by the mobile computing device to the print server, wherein the orchestration processor changes the print time and print location in response to tracked changes in the global position of the mobile computing device, and the submission processor receives a file to be printed from one of the mobile computing device and the print server, and
a printer configured to receive printing instructions from the print server.

13. The printing system of claim 12, wherein the orchestration processor selects a printer based upon a first set of global position information for the mobile computing device.

14. The printing system of claim 12, wherein the print server transmits the print time to the mobile computing device.

15. The printing system of claim 12, wherein the print server is configured to receive a print job status report from a printer and transmit the print job status report to the mobile computing device.

16. The printing system of claim 12, wherein the orchestration processor uses data mining to determine at least one of the print time and the print location.

17. The printing system of claim 12, wherein the print server is part of a network including multiple print servers and the network includes networking protocols for communication among the multiple print servers.

* * * * *